July 18, 1961 W. L. MORRISON 2,992,753
INSULATED SHIPPER CONTAINER WITH
COLLAPSIBLE INTERIOR INSULATION
Filed May 24, 1957 4 Sheets-Sheet 1
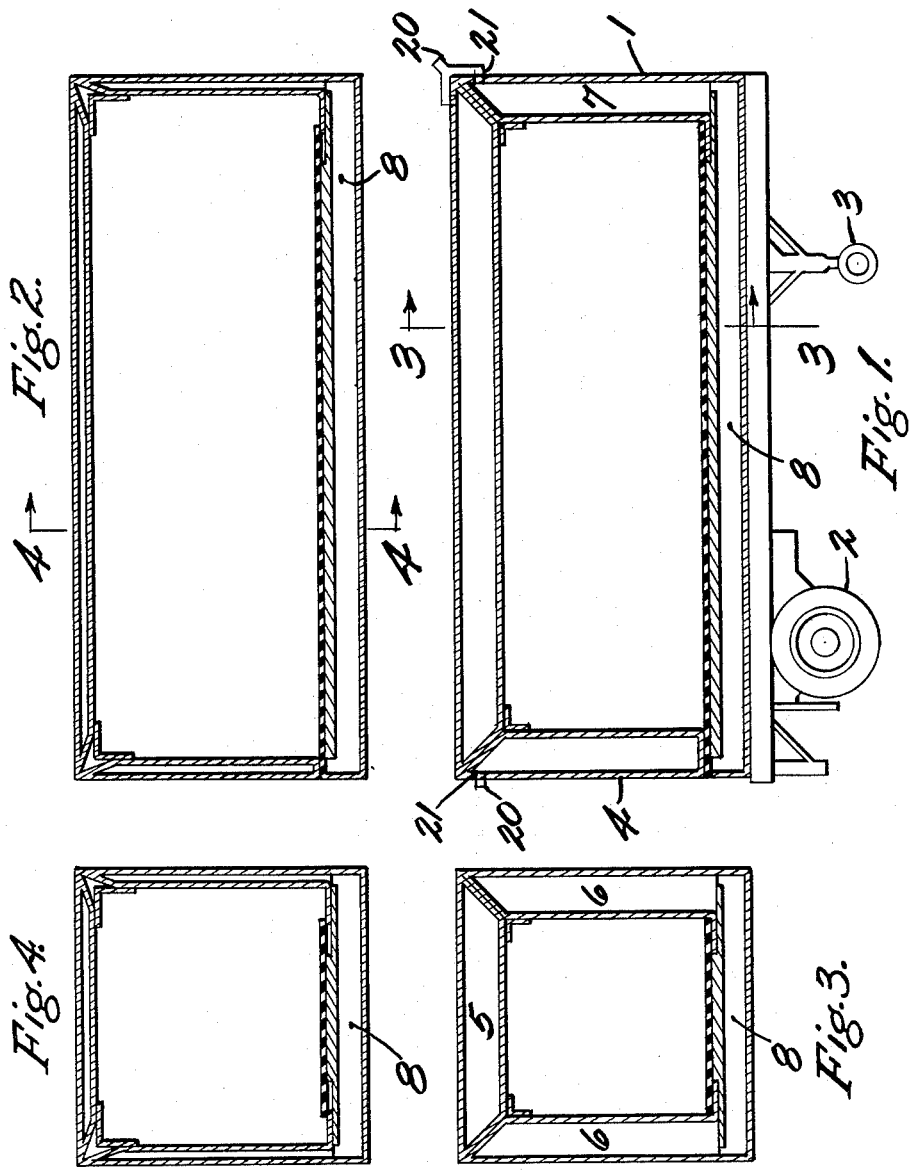
INVENTOR.
WILLARD L. MORRISON
BY PARKER & CARTER
ATTORNEYS

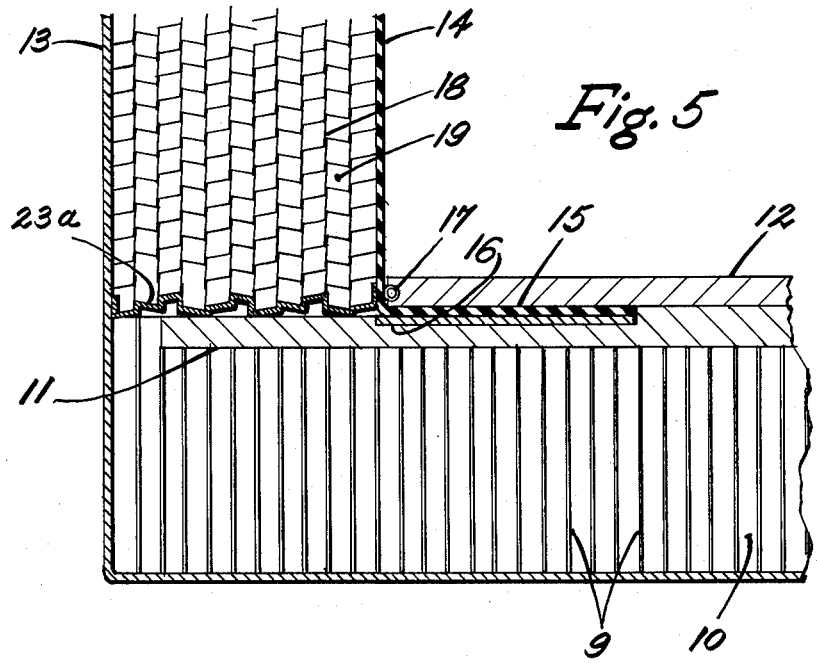
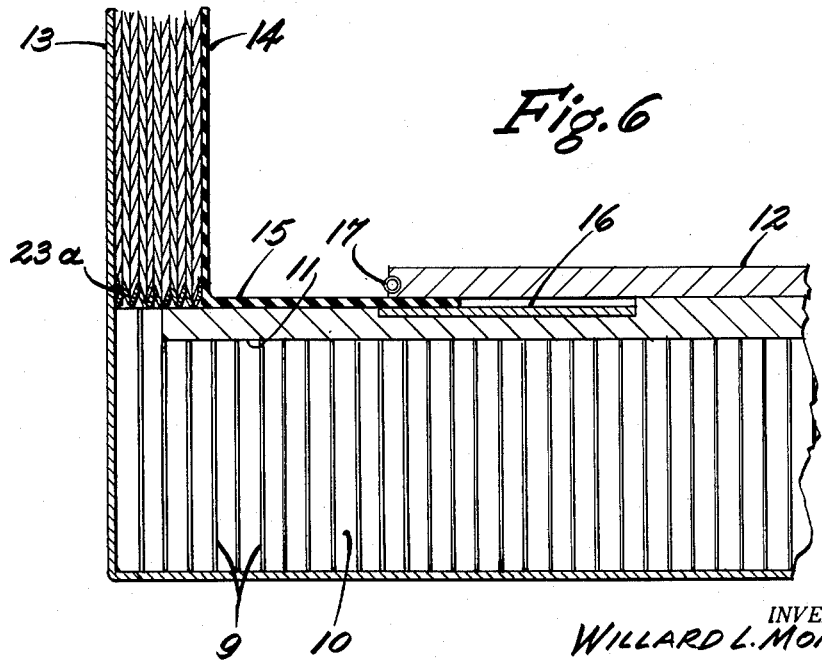

July 18, 1961

W. L. MORRISON 2,992,753

INSULATED SHIPPER CONTAINER WITH
COLLAPSIBLE INTERIOR INSULATION

Filed May 24, 1957

INVENTOR.
WILLARD L. MORRISON
BY PARKER & CARTER
ATTORNEYS

July 18, 1961

W. L. MORRISON
INSULATED SHIPPER CONTAINER WITH
COLLAPSIBLE INTERIOR INSULATION 2,992,753

Filed May 24, 1957

INVENTOR.
WILLARD L. MORRISON
BY PARKER & CARTER
ATTORNEYS

United States Patent Office 2,992,753
Patented July 18, 1961

2,992,753
INSULATED SHIPPER CONTAINER WITH COLLAPSIBLE INTERIOR INSULATION
Willard L. Morrison, Lake Forest, Ill., assignor, by mesne assignments, to Liquefreeze Company, Inc., New York, N.Y., a corporation of New York
Filed May 24, 1957, Ser. No. 661,435
9 Claims. (Cl. 220—9)

This invention relates to improvements in shipper containers and has for one object to provide an insulated container, the cubic capacity of which may be varied in consonance with the insulation space area and the interior carrying space area desired.

Another object of the invention is to provide in a shipper container, for example a truck body, collapsible interior insulation so disposed that when the contents do not need insulation, the insulation can be collapsed in place to give greatly increased cargo space.

Other objects will appear from time to time throughout the specification and claims.

I propose to place inside the container, a lining of collapsible insulation which when expanded will effectively insulate any material contained therein but which when collapsed will greatly increase the volumetric space available for shipment.

The increase available is surprising, for example a trailer body, outside length approximately twenty-nine feet with twelve inches of insulation will have available approximately nine hundred cubic feet of insulated space but if the insulation is collapsed against the walls and roof, the floor being fixed, we might get fourteen cubic feet of relatively uninsulated load space.

The insulation may be expanded and collapsed pneumatically, mechanically or manually.

The invention is illustrated more or less diagrammatically in the accompanying drawings, wherein—

FIGURE 1 is a longitudinal section through an insulated truck body showing the insulation expanded;

FIGURE 2 is a similar section showing the insulation collapsed;

FIGURE 3 is a section along the line 3—3 of FIGURE 1;

FIGURE 4 is a section along the line 4—4 of FIGURE 2;

FIGURE 5 is a detail section through a part of the truck body floor and wall showing the insulation expanded;

FIGURE 6 is a section similar to FIGURE 5 with the insulating wall collapsed;

Like parts are indicated by like characters throughout the specification and drawings.

Figure 7:
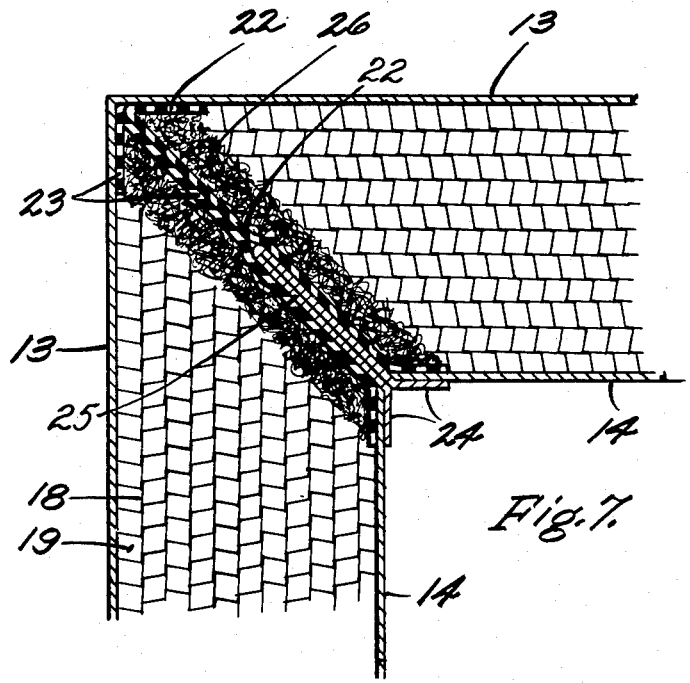
FIGURE 7 is a detail corner section showing the insulation expanded.

The truck or trailer body 1 may be supported on wheels 2, 3 in the usual manner and is closed at the rear end by an insulated door 4. The top, sides and front are lined with compressible or collapsible insulation 5, 6, 7, the floor being fixedly insulated as at 8. FIGURES 1 and 3 show the body fully insulated. FIGURES 2 and 4 show it with the insulation collapsed to give greatly increased storage capacity for material not needing insulation.

Referring to FIGURES 5 and 6, the insulated floor includes a cellular insulating and supporting body 9, the cells being loosely filled with fibrous insulation 10, adhering to the cell walls so as to keep the fibers in fixed position and prevent settling in the cells. A plywood floor 11 is supported on the cellular structure and carries a metal floor plate 12. The floor plate 12 covers the floor to the full extent of the area exposed when the insulation is in the expanded position. Between the fixed container wall 13 and the movable insulated wall 14 is a cellular collapsible insulating structure such as that shown in greater detail in my co-pending application Serial No. 631,800, filed December 31, 1956. The wall has an inward extension 15 which penetrates the space between the floor 12 and the scuff plate 16. When the insulation is expanded, the extension fills the space between the scuff plate and the floor plate. A seal 17 between the edge of the floor plate and the extension 15 provides at the floor level a generally tight joint between the vertical side wall and the horizontal floor when the insulating wall is in the expanded position. The cellular insulating structure 18 is filled with fibrous material such as cotton 19 adhering to the cell walls so as to maintain the cotton in fixed position and permit expansion and contraction of the cells without substantial felting. Thus when the cells are collapsed as in FIGURE 6, the cotton fibers only loosely filling the cells, are compressed. When the cells are expanded, the cotton continues to fill the cells but now in expanded condition at a density such as is best adapted for insulating purposes.

As in FIGURE 6, when the walls 14 and 13 approach and the cells are collapsed, the vertical wall extension 15 is partially withdrawn from the clearance between floor plate 12 and scuff plate 16 which masks the plywood floor 12. This extension may be of metal or of plastic or any other material which will support and not be damaged by occasional contact with the contents of the shipper container. The same is true of the wall 14.

Figure 8:
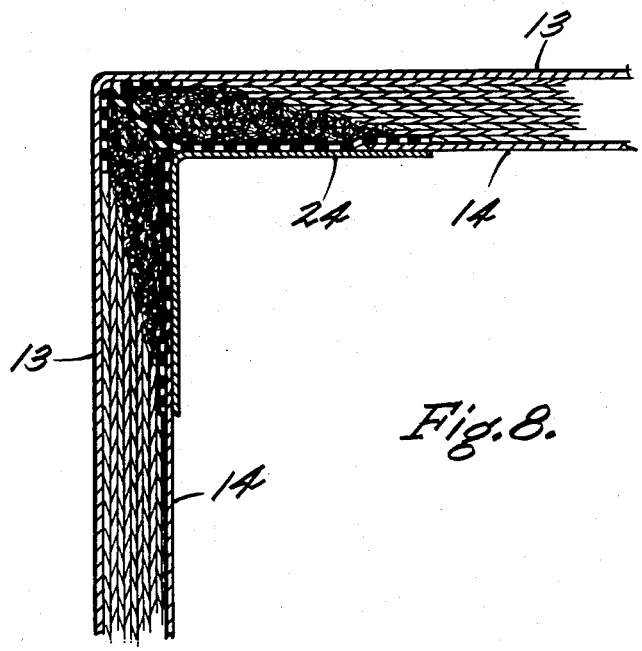
FIGURE 8 is a section similar to FIGURE 7 with insulation collapsed.

FIGURES 7 and 8 illustrate the same type of cellular insulation as shown in FIGURES 5 and 6.

Figure 9:
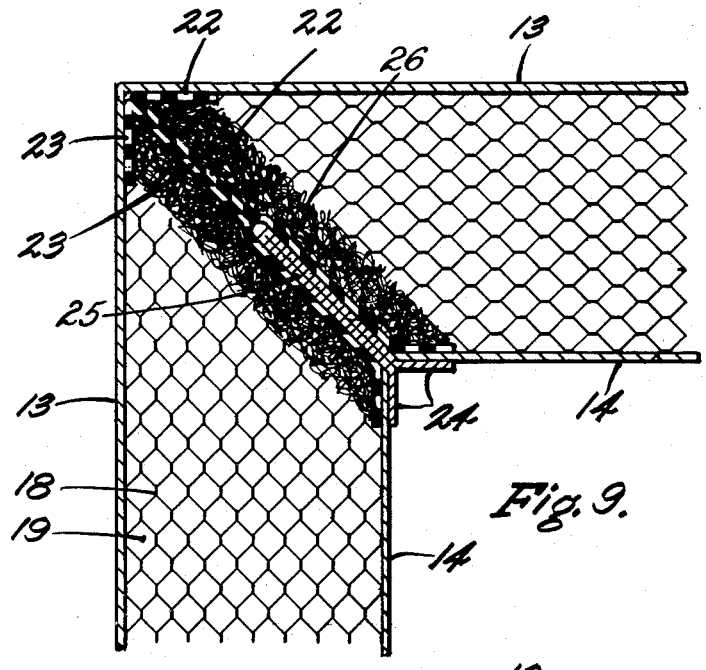
FIGURE 9 is a section similar to FIGURE 7 with slightly different form of insulation.
Figure 10:
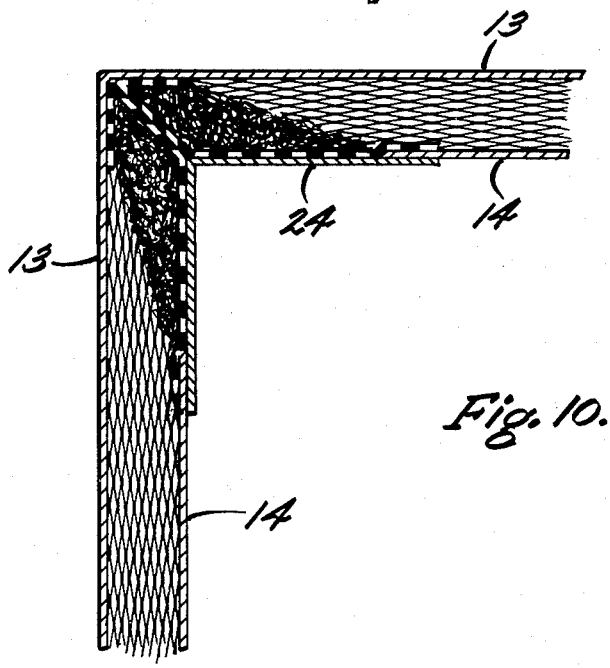
FIGURE 10 is a section similar to FIGURE 9 with insulation collapsed.

FIGURES 9 and 10 show instead of a rectangular cell, a hexagonal cell and these four figures illustrate the sealing means by which insulating effect is continuous when the insulating walls are expanded. When the rectangular cells are collapsed, there is only a slight increase in the dimension parallel with the wall 14. When the hexagonal cells are collapsed, increased dimension is somewhat greater but in each case a satisfactory seal under both conditions is accomplished. It is necessary that such seal be accomplished if the insulation is to be expanded and contracted. Ducts 20 lead to a source of pressure or vacuum communicating through valves 21 with the interior of the insulation defined by the walls 13 and 14 and the flexible gastight sheets 22, 23 and 23a which define air bags containing the cellular insulation so that when it is desired to expand the insulation, air under pressure is forced into the bags. When it is desired to compress the insulation to get more storage space, air is drawn out of the batts and atmospheric pressure causes the collapse of the insulation. Mechanical means might be substituted as might the hands of the operator to accomplish this expansion and contraction.

A flexible or collapsible strip 24 is anchored along opposite edges to the opposed edges of the walls 14 and when the insulation is in the expanded form, this strip is folded back upon itself as at 25 between the membranes 22 and 23 as indicated in FIGURES 7 and 9. When the insulation is collapsed, this strip unfolds into the contour shown in FIGURES 8 and 10. In order to compensate for slight differences in expansion and contraction, the cellular insulation terminates just short of the membranes 22 and 23 and the space is filled by curled hair 26 or similar compressible insulation which will yield as indicated in FIGURES 7 to 10 inclusive, under the different conditions of the insulation.

This corner structure is characteristic of any part of the insulation where two expandible, compressible, insulated walls come edge to edge at a corner and in that respect, different from the characteristic arrangement of the contact between the expandible, compressible, insulating walls and the fixed floor.

The reason for adding the cotton to the cellular structure is, of course, to prevent convection currents in the cells.

I claim:

1. A collapsible insulating panel including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them the insulation comprising a multiplicity of thin walled cells, the axes of the cells being parallel to the rigid plates, the cells being free to expand and contract along lines perpendicular to the plates as the plates move toward and from one another.

2. A collapsible insulating panel including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them, the relative dimensions of the two plates being such that as they recede from one another when they are collapsed, the boundaries of the smaller plates define an angle of forty-five degrees with the plates, the dimensions of the insulating layers being such that they fall within such angle the insulation comprising a multiplicity of thin walled cells, the axes of the cells being parallel to the rigid plates, the cells being free to expand and contract along lines perpendicular to the plates as the plates move toward and from one another.

3. An insulated container including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them the insulation comprising a multiplicity of thin walled cells, the axes of the cells being parallel to the rigid plates, the cells being free to expand and contract along lines perpendicular to the plates as the plates move toward and from one another.

4. An insulated container including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer periperies of the plates and closing the insulation space between them, the relative dimensions of the two plates being such that when they are furthest apart, the boundaries of the smaller plates define an angle of forty-five degrees with the plates the insulation comprising a multiplicity of thin walled cells, the axes of the cells being parallel to the rigid plates, the cells being free to expand and contract along lines perpendicular to the plates as the plates move toward and from one another.

5. An insulated container including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them, the relative dimensions of the two plates being such that when they are furthest apart, the boundaries of the smaller plates define an angle of forty-five degrees with the plates, the dimensions of the insulating layers being such that they fall within such angle the insulation comprising a multiplicity of thin walled cells, the axes of the cells being parallel to the rigid plates, the cells being free to expand and contract along lines perpendicular to the plates as the plates move toward and from one another.

6. A collapsible insulating panel including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them, the binding together with the plates defining a gastight closure, the closure being valved to permit air to be forced into and withdrawn from said closure whereby the plates are selectively forced apart or brought together the insulation comprising a multiplicity of thin walled cells, the axes of the cells being parallel to the rigid plates, the cells being free to expand and contract along lines perpendicular to the plates as the plates move toward and from one another.

7. A collapsible insulating panel including two uniformly shaped parallel, generally rigid plates mounted for movement toward and from one another, the area of one being less than that of the other, a plurality of parallel layers of compressible, expandible insulation, conforming generally in shape to, parallel with and located in the space between the plates, the layers decreasing in dimension from the larger toward the smaller of the plates, a flexible, collapsible binding joining the outer peripheries of the plates and closing the insulation space between them, the insulation comprising a plurality of separate supporting sheets with fibrous insulation interposed between and attached to opposed sheets whereby the insulation is positively expanded when the sheets are separated.

8. A shipper container containing a load supporting floor, walls and a roof, at least two walls being perpendicular to one another and held in fixed position, a liner plate parallel to each of said walls, a collapsible and expandible insulating body comprising a multiplicity of thin, flexible, non heat conductive sheets between each wall and the liner plate, a flexible packing means joining the adjacent edges of the two plates and masking the adjacent edges of the insulating bodies, the opposed edges of the plates being in juxtaposition when the plates are moved away from the wall to expand the insulation and being separated and joined by the packing means when the plates are forced together to compress the insulation the insulation comprising a multiplicity of thin walled cells, the axes of the cells being parallel to the rigid plates, the cells being free to expand and contract along lines perpendicular to the plates as the plates move toward and from one another.

9. A shipper container containing a load supporting floor, walls and a roof, at least two walls being perpendicular to one another and held in fixed position, a liner plate parallel to each of said walls, a collapsible and expandible insulating body comprising a multiplicity of thin, flexible, non heat conductive sheets between each wall and the liner plate, a flexible packing means joining the adjacent edges of the two plates and masking the adjacent edges of the insulating bodies, the opposed edges of the plates being in juxtaposition when the plates are moved away from the wall to expand the insulation and being separated and joined by the packing means when the plates are forced together to compress the insulation, fibrous insulating means interposed between the packing means and the opposite edges of the insulating bodies.

References Cited in the file of this patent

UNITED STATES PATENTS

| | | |
|---|---|---|
| 1,457,496 | Butler | June 5, 1923 |
| 2,507,379 | Morrison | May 9, 1950 |
| 2,728,479 | Wheeler | Dec. 27, 1955 |
| 2,807,405 | Lambert | Sept. 24, 1957 |